Jan. 9, 1940.  W. J. DE WITT  2,186,780

FISH LURE

Filed Aug. 26, 1938

Inventor
William J. DeWitt
by Roberts, Cushman & Woodbury
Att'ys.

Patented Jan. 9, 1940

2,186,780

UNITED STATES PATENT OFFICE 2,186,780

FISH LURE

William J. DeWitt, Auburn, N. Y., assignor to Shoe Form Co., Inc., Auburn, N. Y., a corporation of New York Application August 26, 1938, Serial No. 226,885

5 Claims. (Cl. 43—46)

This invention relates to an improvement in fish lures and has as its primary object a lure comprising a buoyant body, the head of which has a downwardly and forwardly inclined upper surface to which the leader is attached, the head terminating below the body and extending below the surface of the water when the lure is floating thereon, and said lure being broadest at the head and tapering uninterruptedly to the tail.

Other objects of this invention are to provide a lure of the above type with a flat head similar in appearance to a duck's bill; a hollow body, such body preferably consisting of an upper concave section, a lower concave section and a partition forming with such sections sealed upper and lower compartments; and a weight in the lower compartment fixed to the lower section and preferably mounted eccentrically of the center line of the lure.

These and other objects will appear from a consideration of the following description in which a lure embodying one form of the invention is set forth in detail and of the drawing wherein such embodiment is illustrated and in which.

Figure 3:
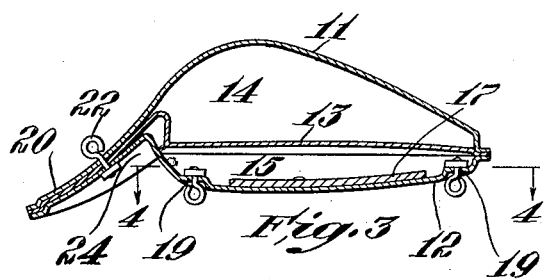
Fig. 3 is a longitudinal sectional view taken along the line 3—3 of Fig. 2.
Figure 4:
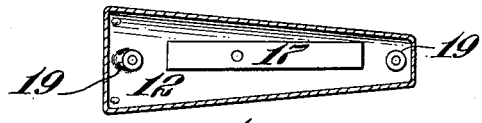
Fig. 4 is a similar view taken along the line 4—4 in Fig. 3.

The fish lure 10 illustrated in the drawing comprises an upper concave section 11, a lower concave section 12 and a partition 13. The sections and partition are assembled as shown in Fig. 3 to provide an upper compartment 14 and a lower compartment 15. Both compartments are sealed so that the lure is buoyant and normally floats freely on the water, the surface of which is indicated by a dotted line 16 in Fig. 1.

Fixed to the bottom of the lower section 12 is a weight 17 preferred secured slightly eccentric to the center line of the lure. Depending from the bottom of the lure are hooks 18 fixed bosses 19 formed in the section 12 at the ends of the weight 17 along the center line of the lure.

The head of the lure is shaped to form a duck-bill-like projection 20 substantially flat on the upper and lower surfaces. Such projection is inclined downwardly and forwardly and terminates below the bottom plane of the lure body 21 so that it extends below the surface of the water when the lure is floating thereon. As shown particularly in Fig. 3, the upper and lower sections are compressed into contact with the partition. Fixed to the projection 20 is an eye 22 to which the leader 23 is attached. At the underside of the lure between the projection 20 and the body 21 is formed a pocket or recess 24.

Figure 1:
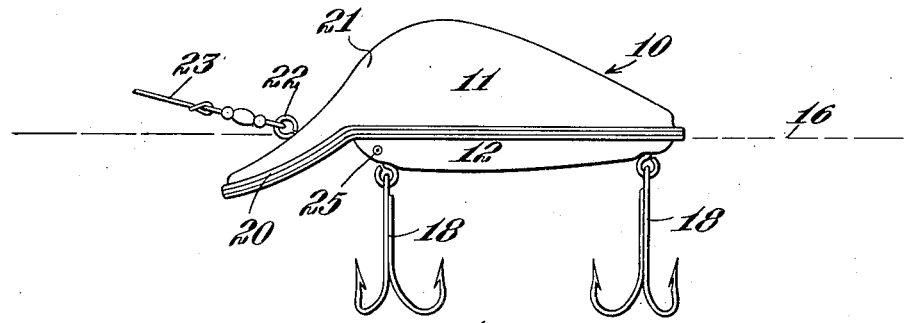
Fig. 1 is a view in side elevation of a lure embodying this invention.

When the lure is cast it drops upon the water in the position shown in Fig. 1. Upon retrieving the leader, the projection 20 being below the surface causes the lure to dive and holds it down below the surface until the retrieving pull is relaxed, whereupon, due to the buoyancy of the body 21, the lure rises at once to the surface. As the lure is so traveling, water will be caught by the pocket 24 and released from time to time, thus providing bubbles first at one side of the lure and then at the other. This disturbs the water and serves to attract the attention of the fish to the moving lure. Furthermore, when the weight 17 is eccentrically mounted the lure, being thereby somewhat out of balance, will wiggle slightly from side to side as it moves along. Such wiggling not only serves to increase the disturbance of the water but also to rock the lure slightly so that the water trapped in the pocket 24 escapes at both sides of the lure.

Figure 2:
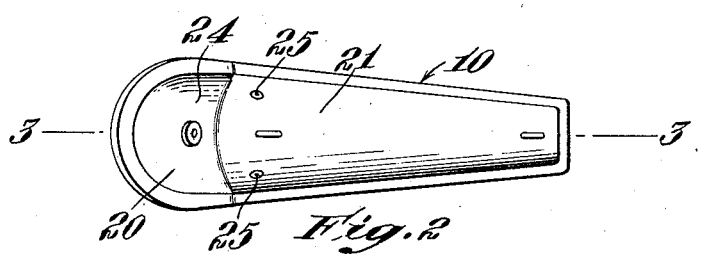
Fig. 2 is a bottom plan view of such lure.

It will be noted that the lure is tapered uninterruptedly from head to tail (see Fig. 2) so that it presents no resistance to the movement of the lure which leaves a slight wake somewhat undulated by reason of the wiggling and rocking mentioned above. In the lower section of the lure are formed nubs 25 which may be brightly colored to imitate eyes and thus increase the attractiveness of the lure when seen from below.

While one embodiment of this invention has been shown and described, it will be understood that I am not limited thereto and that other embodiments may be made without departing from the spirit and scope thereof as set forth in the following claims.

I claim:

1. A fish lure adapted to be attached to a leader and comprising a buoyant body and a flat head inclined downwardly and forwardly to form a flat duck-bill-like projection to which the leader is secured, said body consisting of an upper concave section and a lower concave section and a partition forming with said sections sealed upper and lower compartments, said projection terminating below the body and extending below the surface of the water when the lure is floating thereon and spaced from the lower section to form a pocket in which water is a caught whereby, when the leader is retrieved, the lure will be caused to dive and the pocket releases the water when the retrieving movement ceases and the lure rises, thus providing bubbles at the sides of the lure.

2. A fish lure adapted to be attached to a leader and comprising a hollow body consisting of an upper concave section, a lower concave section and a partition forming with said sections sealed upper and lower compartments, a weight in the lower compartment and fixed to the lower section, and hooks depending from said section, the head of said lure being inclined downwardly and forwardly to form a flat duck-bill-like projection to which the leader is secured, said projection terminating below the lower section, whereby as the lure is retrieved the projection will cause the lure to dive.

3. A fish lure adapted to be attached to a leader and comprising a hollow body consisting of an upper concave section, a lower concave section and a partition forming with said sections sealed upper and lower compartments, a weight in the lower compartment and fixed to the lower section, and hooks depending from said section, the head of said lure being inclined downwardly and forwardly to form a flat duck-bill-like projection to which the leader is secured, said projection terminating below the lower section and forming therewith a pocket in which water is caught and extending below the surface of the water when the lure is floating thereon, whereby as the lure is retrieved the projection will cause the lure to dive and as the retrieving movement ceases, the pocket will release the water caught therein, thus causing bubbles to rise at the sides of the lure.

4. A fish lure adapted to be attached to a leader and comprising a hollow body consisting of an upper concave section and a lower concave section and a partition forming with said sections sealed upper and lower compartments, a weight in the lower compartment and fixed to the lower section eccentric of the center line of the lure, the head of said lure being inclined downwardly and forwardly to form a flat duck-bill-like projection to which the leader is secured, said projection terminating below the lower section and extending below the surface of the water when the lure is floating thereon, whereby when the lure is retrieved the projection will cause the lure to dive and the weight will cause the lure to wiggle.

5. A fish lure adapted to be attached to a leader and comprising a hollow body consisting of an upper concave section and a lower concave section and a partition forming with said sections sealed upper and lower compartments, a weight in the lower compartment and fixed to the lower section eccentric of the center line of the lure, the head of said lure being inclined downwardly and forwardly to form a flat duck-bill-like projection to which the leader is secured, the surfaces of the projection being substantially flat and the lower section forming a pocket between the projection and the body in which water is caught as the lure travels through the water, said projection terminating below the lower section and extending below the surface of the water when the lure is floating thereon, whereby when the lure is retrieved the projection will cause the lure to dive, the weight will cause the lure to wiggle, and the water caught in the pocket is released from time to time when the retrieving movement ceases and the lure rises, thus providing bubbles at the sides of the lure.

WILLIAM J. DeWITT.